UNITED STATES PATENT OFFICE.

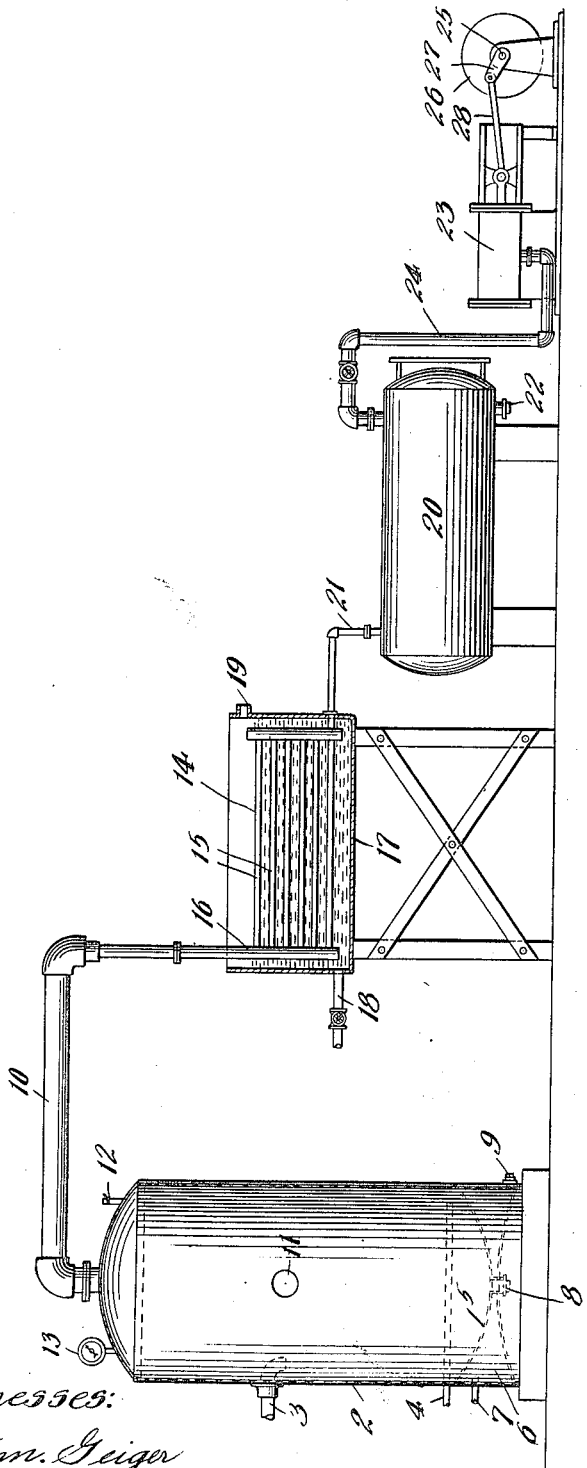

JOHAN D. OUDSTEYN, OF CHICAGO, ILLINOIS.

PROCESS OF RENOVATING BUTTER.

1,042,471.

Specification of Letters Patent.

Patented Oct. 29, 1912.

Application filed November 24, 1911. Serial No. 662,117.

*To all whom it may concern:*

Be it known that I, JOHAN DIEDERIK OUDSTEYN, a subject of the Queen of the Netherlands, residing in Chicago, in the county of Cook and State of Illinois, have invented a new and useful Improvement in Processes of Renovating Butter, of which the following is a specification.

This invention is an improved method of renovating rancid butter and rancid oils.

It consists in the treatment of the butter or oil in the manner hereinafter set forth.

In case the material to be renovated, is rancid butter, I first melt the same at a temperature as low as possible, and separate from it the water, salt and casein. In the case of oil, this preliminary operation is of course not necessary. I next put the melted fat or the oil in a vacuum tank, filling the latter preferably about one third full, the fat or oil being drawn into the tank by the suction caused by the vacuum therein. As soon as the fat or oil is in the tank, I force upward through the mass a blast of live steam, and continue such blast for one hour or for one and a half hours, depending upon the rancidity of the fat or oil, the process being longer if the rancidity is extreme. While the blast is being thus forced into the fat or oil, the air is being continuously exhausted from the tank, so that the rising vapor or steam from the fat or oil is drawn from the tank and into a condenser where it is cooled, and from which the condensations pass into and are collected in a receiver from which they can be periodically discharged.

In the operations above described, it will be noted that after the fat or oil has been admitted to the tank, that no heat is applied to it except such as it acquires from the steam passing through it and from the floor as hereinafter stated. This is a very important feature of the process because by it I am enabled to renovate the butter or oil without cooking it or injuriously heating it. In fact the fat or oil thus treated should not be raised in temperature above 185 degrees F. This low temperature may be accounted for by the fact that the steam quickly passes through the material and does not delay its passage long enough to give off much of its heat, or impart it to the material.

In the accompanying drawing, I show an apparatus well adapted to be used in the working of my process, and in such drawing 2 represents the tank in which the material is treated, and the same is provided with an inlet 3 through which the material is admitted, a steam inlet at 4, a floor below the steam inlet at 5, a steam space 6 below said floor and a steam inlet 7 for heating said space, a discharge outlet 8 from the main body of the tank, a discharge at 9 from the space 6, a connection 10 leading to the vacuum pump, sight windows on opposite sides at 11, an air inlet at 12 and a pressure gage at 13.

The steam enters the tank under pressure, desirably not less than 45 pounds, and of course possesses sufficient power to force itself up through the body of the fat or oil, and produce a constant ebullition or agitation therein, much like that occurring in a fluid while boiling. And in this way, the steam acts to take up and carry away with it all rancidity and impurities in the fat or oil. And this operation of the steam is facilitated by the vacuum producing apparatus, which exerts an upward suction on the steam while it is moving through the oil, so that all parts of the mass are brought into direct contact with the steam and the latter is thus enabled to draw out the impurities.

The steam, vapor and gases rising from the fat or oil are conducted by the pipe 10 to the condenser 14. This comprises a battery of horizontal pipes 15 joined at their ends to vertical headers 16, and located in an open tank 17 to which water is admitted through the pipe 18 and from which there is an overflow discharge at 19. The condensations are drawn from the condenser into a receiver 20 through the pipe 21 where they collect and are drawn off through the opening 22 whenever necessary.

A vacuum producing pump 23 is connected to the receiver 20 by the pipe 24 and is operated by the shaft 25 and pulley 26 through the crank 27 and pitman 28. This pump by the connections shown maintains a more or less complete vacuum throughout the entire apparatus thus enabling the steam to perfectly carry off the rancid elements from the butter or oil.

The steam chamber 6 is warmed so that the portions of the fat immediately above it may be kept fluid and thus be induced to circulate in the mass above it, instead of solidifying.

Because of the partial vacuum produced above and beyond the fat or oil it is possible to pass steam or vapor through the mass at a lower tension or pressure than would be otherwise required. This passage of the steam does not cook the fat or oil, while at the same time the essential oils which give the vile odor are readily picked up by the steam and carried off by it. Moreover the agitation of the material without the presence of external air or other oxidizing gas, prevents oxidation and the offensive tallowy condition resulting therefrom.

Another important feature of my invention resides in the condensing of the steam after the same has been passed through the melted fats or oils. The steam upon condensing creates of its own accord a partial vacuum in the receptacle 2, and thus materially assists the pump 23 in maintaining a partial vacuum over the liquid butter or other oils.

I claim:—

1. The process of renovating rancid butter or oil consisting in passing a blast of steam through the melted butter or oil while confined in a chamber free from air and from which the steam is being exhausted continuously while the blast is in operation.

2. The process of renovating rancid butter or oils, which consists in passing a blast of steam through the material while confined in a chamber having the vapor pressure therein at less than normal or atmospheric pressure whereby the boiling point of the butter or oils is maintained below normal.

3. The process of renovating rancid butter or oil, which consists in passing a blast of steam through the butter or oil while in a liquid state, and while confined in a chamber having the vapor pressure therein kept continuously at less than normal or atmospheric pressure whereby the boiling point of the butter or oils is maintained below normal.

4. The process of renovating rancid butter which consists in passing a blast of steam through the butter or oil while in a liquid state and while confined in a chamber, condensing the steam after the same has passed through the liquid butter or oil and exhausting the vapors from the chamber.

5. The process of renovating rancid butter or oil which consists in simultaneously passing a blast of steam through the butter or oil while in a melted condition and while confined in a chamber free from air, and exhausting the vapors from the chamber.

6. The process of renovating rancid butter or oils which consists in passing a blast of steam through the liquefied butter or oils and simultaneously maintaining the temperature of the melted contents below the normal boiling point of the same.

7. The process of renovating rancid butter or oil which consists in passing a blast of steam through the liquefied butter or oil while contained in a chamber free from an oxidizing gas and simultaneously maintaining the temperature of the melted contents of the chamber below the normal boiling point of the melted butter or oil.

8. The process of renovating rancid butter or oil which consists in passing a blast of steam through the material while in a liquefied condition and while free from an oxidizing gas and at a temperature below 185 degrees Fahrenheit.

JOHAN D. OUDSTEYN.

Witnesses:
 PEARL ABRAMS,
 EDW. S. EVARTS.